(12) United States Patent
Chu (10) Patent No.: US 10,503,273 B1
(45) Date of Patent: Dec. 10, 2019

(54) ARRAY DISPLAY SWITCH

(71) Applicant: Ching-Hsiung Chu, Taipei (TW)

(72) Inventor: Ching-Hsiung Chu, Taipei (TW)

(*) Notice: Subject to any disclaimer, the term of this patent is extended or adjusted under 35 U.S.C. 154(b) by 0 days.

(21) Appl. No.: 15/979,480

(22) Filed: May 15, 2018

(51) Int. Cl.
*G06F 3/023* (2006.01)
*G06F 3/14* (2006.01)

(52) U.S. Cl.
CPC .......... *G06F 3/0238* (2013.01); *G06F 3/1446* (2013.01)

(58) Field of Classification Search
CPC .............................. G06F 3/0238; G06F 3/1446
USPC .......................................... 345/1.3, 170, 172
See application file for complete search history.

(56) References Cited

U.S. PATENT DOCUMENTS

| | | | | |
|---|---|---|---|---|
| 5,818,361 A * | 10/1998 | Acevedo | ............... | G06F 3/0238 341/23 |
| 5,867,149 A * | 2/1999 | Jaeger | ................... | H01H 9/181 200/302.2 |
| 5,962,830 A * | 10/1999 | Wallace | ................ | G06F 3/0238 235/379 |
| 6,720,951 B2 * | 4/2004 | Taguchi | .............. | G06F 3/04886 345/104 |
| 6,798,359 B1 * | 9/2004 | Ivancic | ................. | G06F 3/0231 341/23 |
| 7,071,845 B2 * | 7/2006 | Ivancic | ................. | G06F 3/0231 341/23 |
| 7,423,557 B2 * | 9/2008 | Kang | .................... | G06F 3/0238 341/20 |
| 7,477,239 B2 * | 1/2009 | Ray | ....................... | G06F 3/0238 345/170 |
| 8,024,004 B2 * | 9/2011 | Sohn | ..................... | G06F 1/1626 455/550.1 |
| 8,692,736 B1 * | 4/2014 | Johnston | ............. | G06F 15/0291 345/1.2 |
| 9,250,770 B2 * | 2/2016 | Choi | ..................... | G06F 3/0238 |
| 10,242,810 B2 * | 3/2019 | Mahajan | ............... | H01H 3/125 |
| 2009/0270078 A1 * | 10/2009 | Nam | .................... | G06F 3/0238 455/414.1 |

* cited by examiner

Primary Examiner — Michael Pervan (57) ABSTRACT

An array display switch includes a plurality of display switches arranged in an array to display different frames. Users press, touch or sense any one(s) of the plurality of display switches to not only change interactively the frames displayed but also turn on/off any one(s) of the plurality of display switches. The plurality of display switches jointly displays an integrated full-screen frame.

7 Claims, 8 Drawing Sheets

ARRAY DISPLAY SWITCH

BACKGROUND OF THE INVENTION

1. Technical Field

The present disclosure relates to an array display switch.

2. Description of Related Art

The main purpose of keys is to serve as an interface for transmitting various commands required by users, so as to execute the commands. To distinguish the commands and related functions, different symbols or numerals are printed on the keys, respectively, so that users can see the symbols or numerals and press the corresponding keys accurately to transmit the commands correctly. In addition to the symbols or numerals, the keys emit light in different colors to distinguish the commands and functions of the keys. However, the arrangement of the aforesaid symbols, numerals, and light in different colors is predetermined by key manufacturers and thus is not subject to changes by users to the detriment of user-friendliness and usage flexibility.

BRIEF SUMMARY OF THE INVENTION

The objective of the present disclosure is to provide an array display switch which comprises a plurality of display switches arranged in an array and adapted to display different frames. Users press, touch or sense any one(s) of the plurality of display switches to not only interactively change the frames displayed but also turn on/off any one(s) of the plurality of display switches. The display switches are disposed on a substrate. At least one port or a wireless transmission apparatus is disposed at any one edge of the substrate to connect to an external control apparatus. The frames show video or graphic data. The data is burned or coded to the array display switch by a burning or coding device in advance. Alternatively, a control apparatus controls the frames displayed on the display switches and controls the turning on/off of the display switches. The display switches each comprise a base, a display screen and a transparent cover. The display switches each display a single frame. The display switches simultaneously display their respective frames and thereby jointly display a full-screen frame. Furthermore, users press, touch or sense any one(s) of the plurality of display switches to not only change the frames displayed but also turn on/off any one(s) of the plurality of display switches once or more.

DETAILED DESCRIPTION OF THE PREFERRED EMBODIMENTS

Referring to FIGS. 1-8, there are shown a perspective view and a partial schematic view of an array display switch according to the present disclosure and schematic views of the array display switch according to a preferred embodiment of the present disclosure. As shown in the diagrams, the array display switch of the present disclosure comprises: a substrate 1 with at least one port 10 disposed at one edge of the substrate 1 to connect to an external control apparatus 3; and a plurality of display switches 2 disposed on the substrate 1, spaced apart equidistantly, and arranged in a rectangular array. The display switches 2 each comprise a base 21, a display screen 22 and a transparent cover 23.

Figure 1:
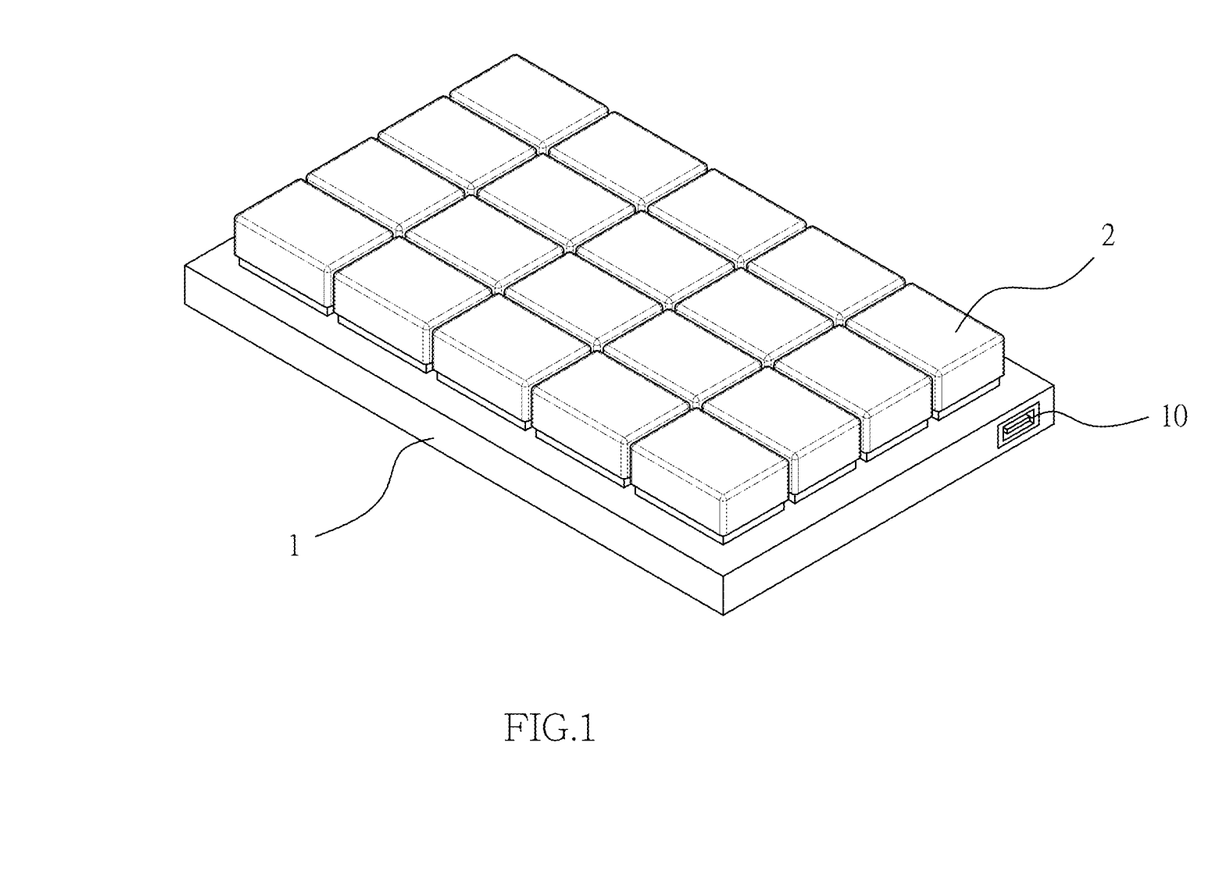
FIG. 1 is a perspective view of an array display switch according to the present disclosure.
Figure 2:
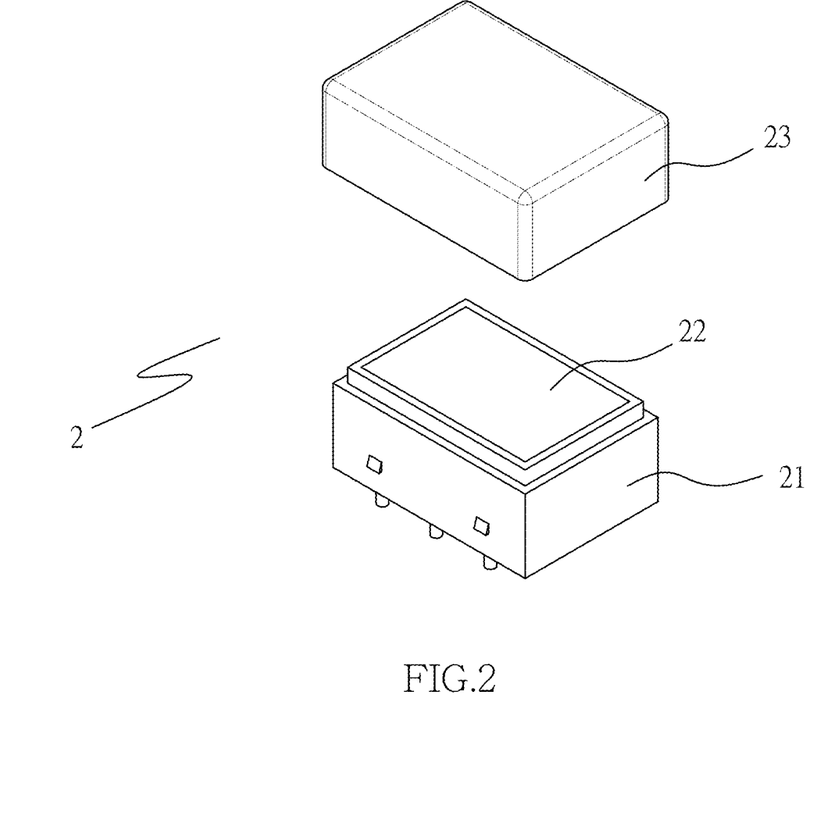
FIG. 2 is a partial schematic view of the array display switch according to the present disclosure.
Figure 3:
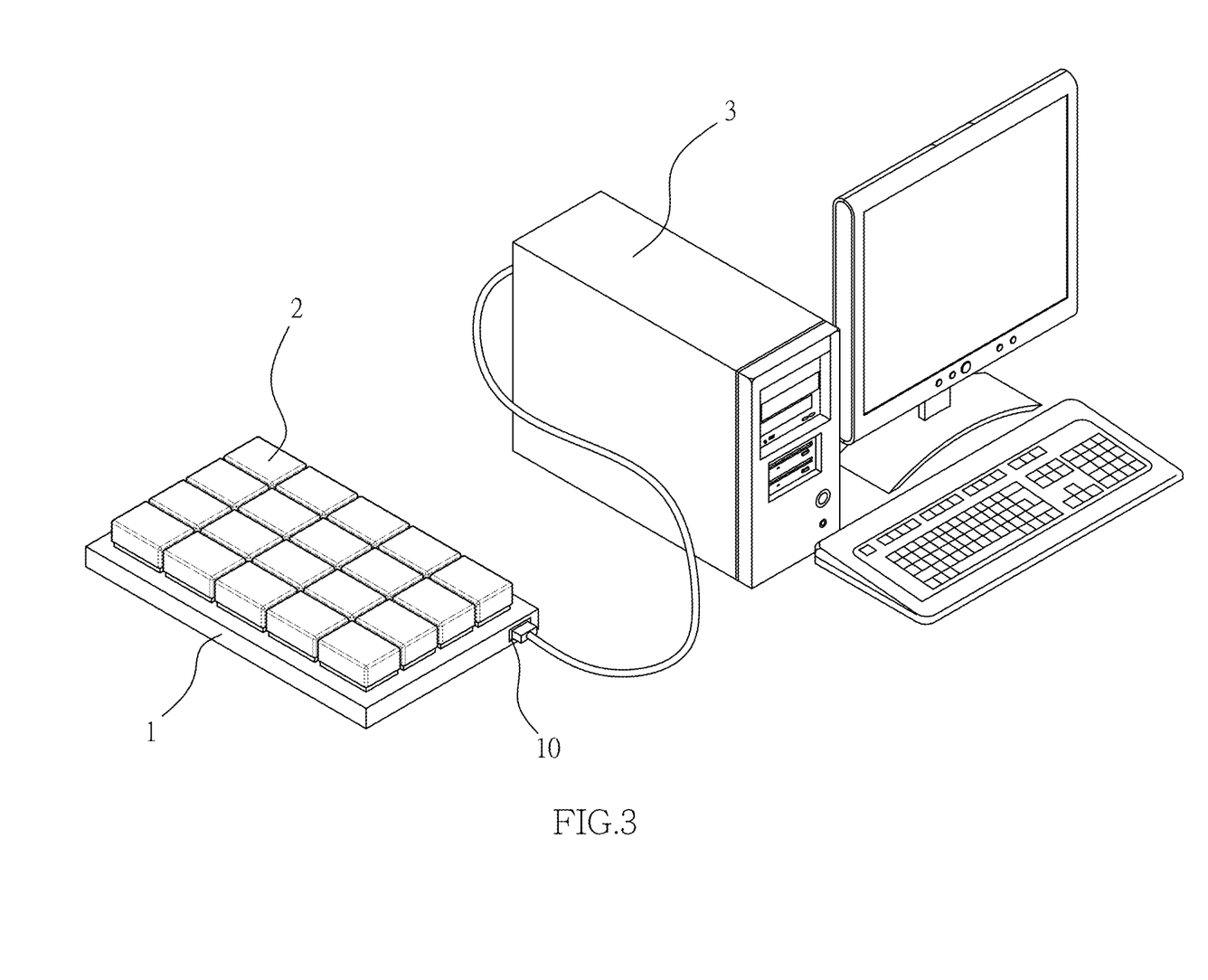
FIG. 3 is a schematic view 1 of the array display switch according to a preferred embodiment of the present disclosure.

According to the preferred embodiment of the present disclosure, the plurality of display switches 2 is disposed on the substrate 1, spaced apart equidistantly, and arranged in a rectangular array. In order for the array display switch to operate, the at least one port 10 disposed at one edge of the substrate 1 connects to the external control apparatus 3 (as shown in FIG. 3). The control apparatus 3 adjustably controls the display switches 2 to display various symbols, numerals or frames on the display screens 22.

Figure 4:
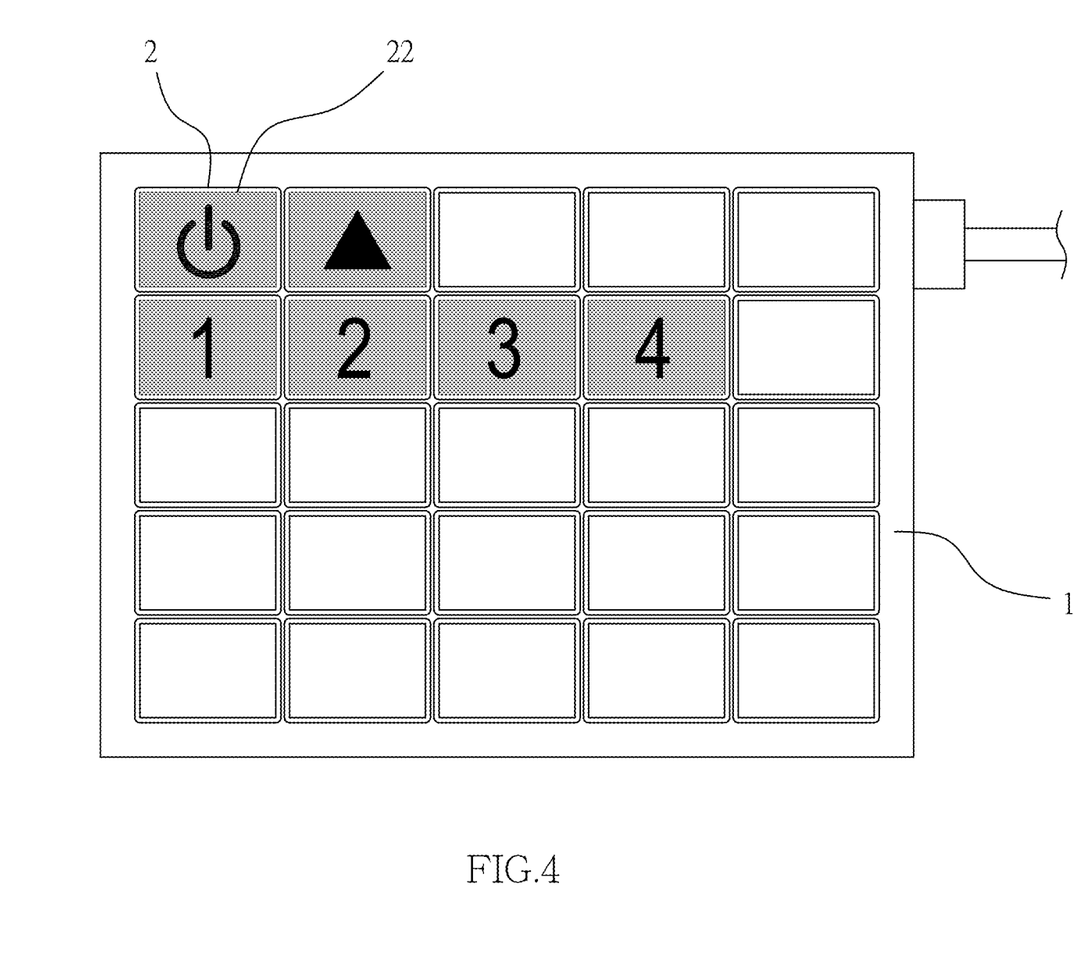
FIG. 4 is a schematic view 2 of the array display switch according to the preferred embodiment of the present disclosure.

As shown in FIG. 4, the external control apparatus 3 controls the display switches 2 to display different symbols and numerals on the display screens 22, respectively, thereby allowing users to enter commands. In addition to displaying the symbols and numerals, the display switches 2 display background colors in contrast to those of the symbols and numerals, so as to render the symbols and numerals conspicuous enough for users to see in a dim environment.

Figure 5:
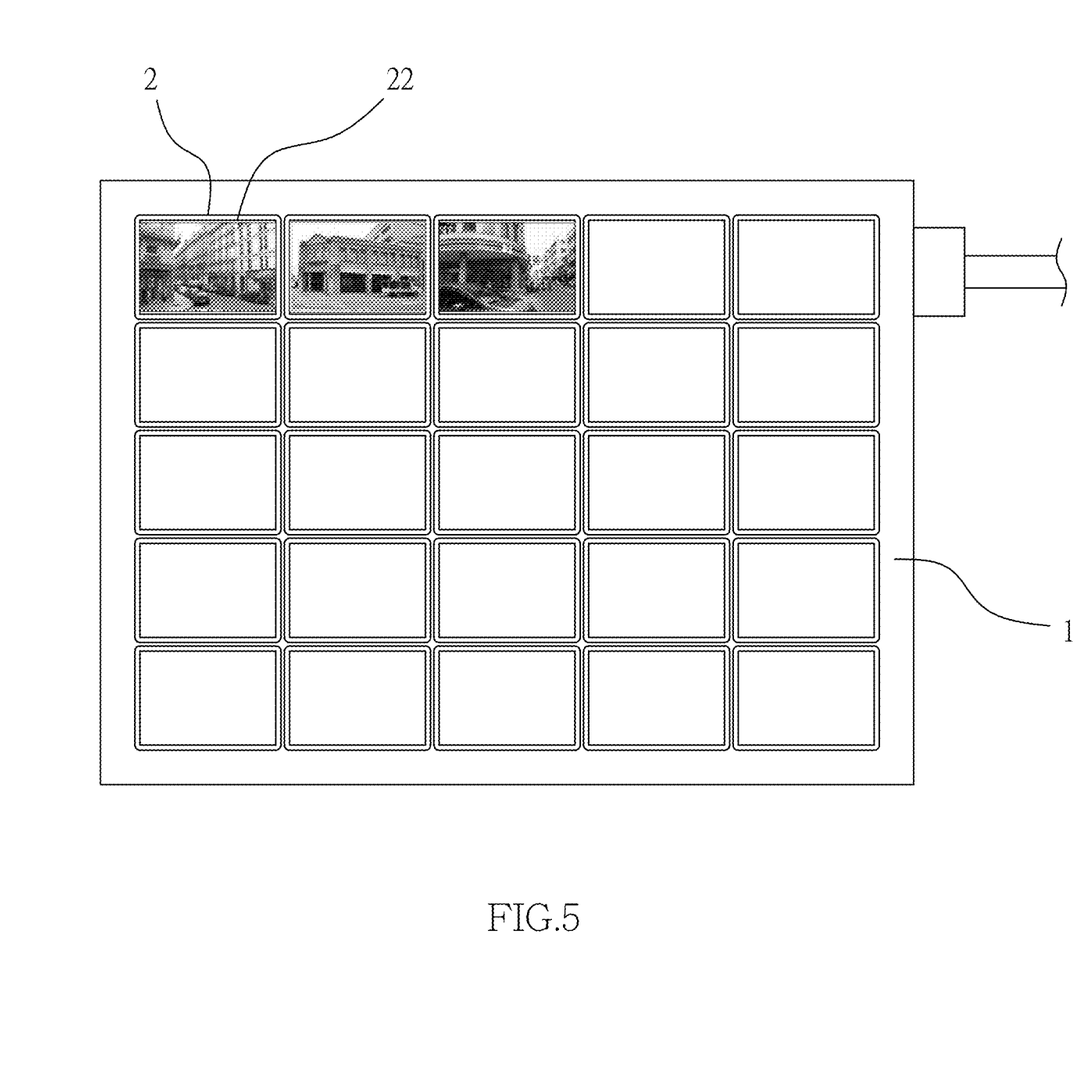
FIG. 5 is a schematic view 3 of the array display switch according to the preferred embodiment of the present disclosure.

As shown in FIG. 5, the external control apparatus 3 controls the display switches 2 to display different frames, such as monitoring frames or graphics, on the display screens 22, respectively. Displaying the monitoring frames entails displaying by the display switches 2 real-time frames captured by picture-taking lenses. In a variant embodiment of the present disclosure, users turn on or off the display switches 2 by pressing the display switches 2.

Figure 6:
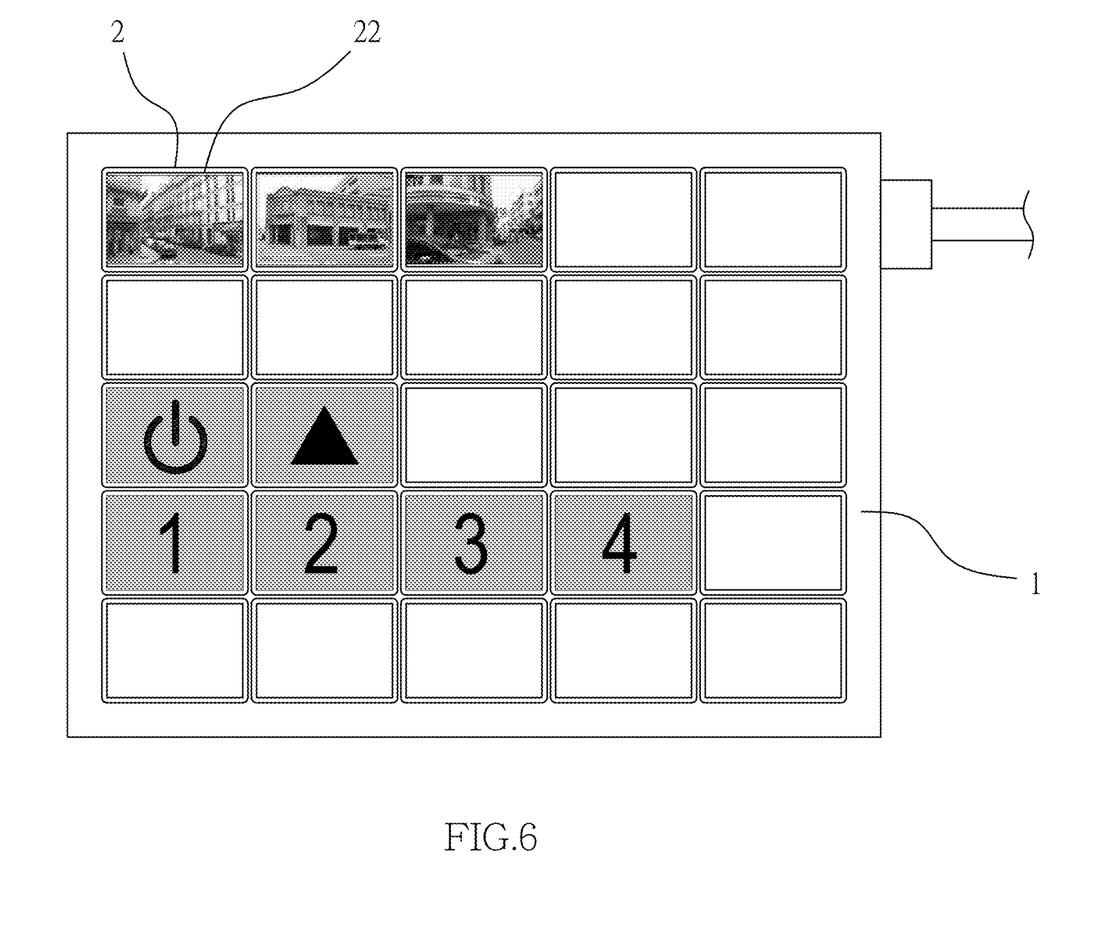
FIG. 6 is a schematic view 4 of the array display switch according to the preferred embodiment of the present disclosure.

Not only can the display switches 2 display different symbols and numerals or a single frame, but a single display switch 2 can also display a single symbol, numeral and frame as shown in FIG. 6.

Figure 7:
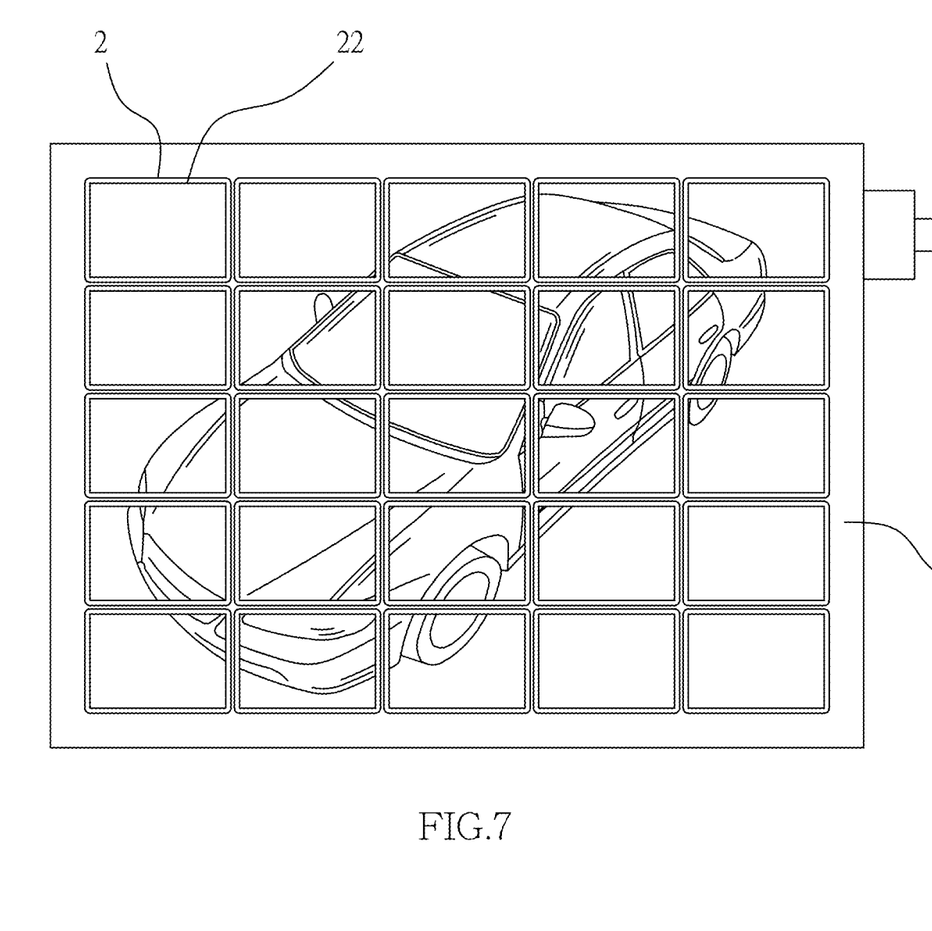
FIG. 7 is a schematic view 5 of the array display switch according to the preferred embodiment of the present disclosure.

As shown in FIG. 7, with the display switches 2 being disposed on the substrate 1, spaced apart equidistantly, and arranged in a rectangular array, it is feasible for the external control apparatus 3 to control all the display switches 2 to jointly display a full-screen frame. Hence, a single frame can be displayed by a combination of the display switches 2.

Figure 8:
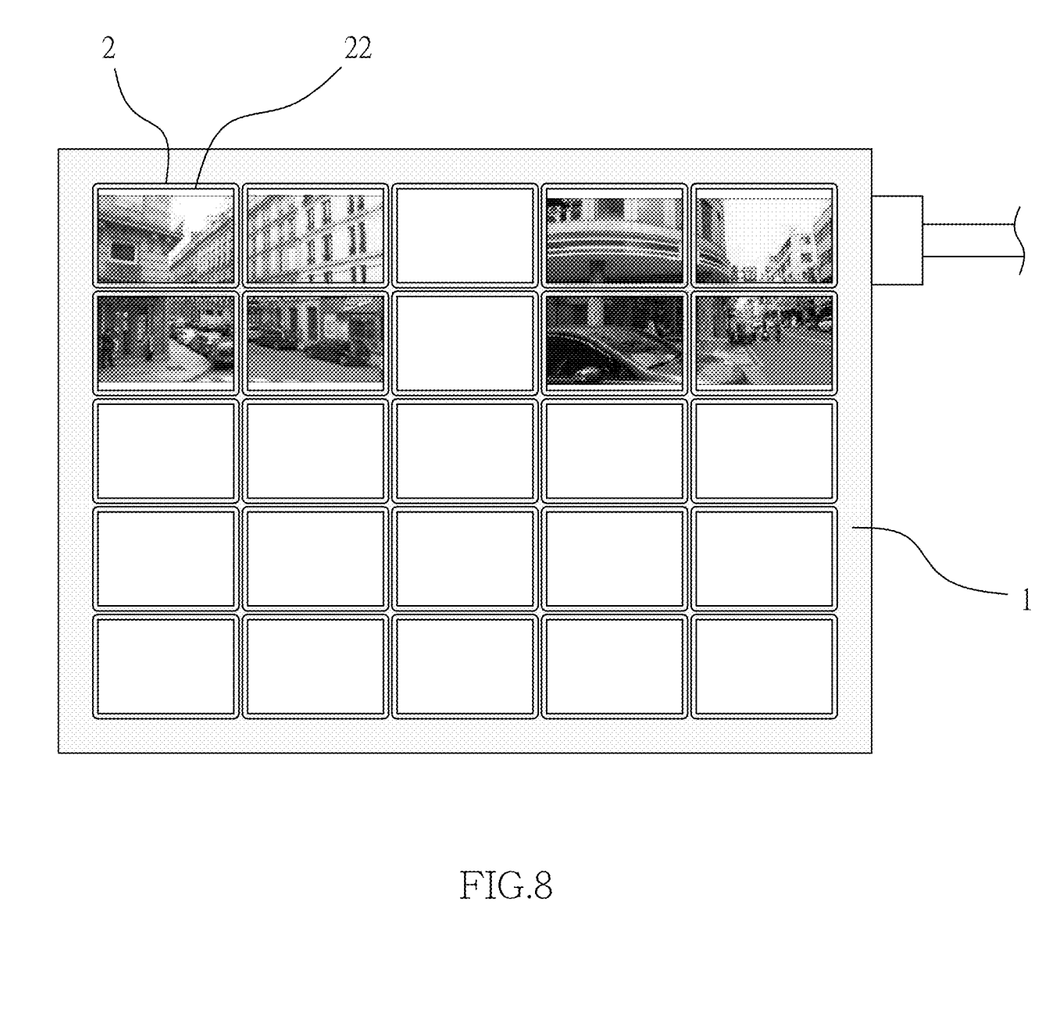
FIG. 8 is a schematic view 6 of the array display switch according to the preferred embodiment of the present disclosure.

As shown in FIG. 7, not only do all the display switches 2 jointly display a single frame, but the joint display of a frame may also be restricted to just some of the display switches 2. The latter scenario is explained below. The display switches 2 are grouped, so as to define several zones each composed of several display switches 2. Each zone of the display switches 2 displays a frame. As shown in FIG. 8, a frame is jointly displayed by four display switches 2 located at the upper left corner, whereas another frame is jointly displayed by four display switches 2 located at the upper right corner, and information pertaining to the frames is displayed on the other neighboring display switches 2.

According to the preferred embodiment of the present disclosure, a plurality of display switches 2 is disposed on the substrate 1, spaced apart equidistantly, and arranged in a rectangular array, and the at least one port 10 is disposed at one edge of the substrate 1 to connect to the external control apparatus 3, so as for the control apparatus 3 to adjustably control the display switches 2 to display various symbols, numerals or frames with a view to meeting user needs. Therefore, the present disclosure has wide application, including conventional, basic functions of command output control, frame monitoring, and graphic display.

In another embodiment of the present disclosure, the array display switch comprises a plurality of display switches 2 arranged in an array to display different frames such that users press, touch or sense any one(s) of the plurality of display switches 2 to not only change the frames displayed but also turn on/off any one(s) of the plurality of display switches 2. The display switches 2 are disposed on the substrate 1. At least one port 10 or a wireless transmission apparatus (not shown) is disposed at one edge of the substrate 1 to connect to an external control apparatus 3. The frames show video or graphic data. A burning or coding device (not shown) burns or codes the data to the array display switch in advance. Alternatively, the control apparatus 3 controls the frames displayed on the display switches 2 and the turning on/off of the display switches 2. The display switches 2 each comprise a base 21, a display screen 22 and a transparent cover 23. The display switches 2 each display a single frame. Alternatively, the plurality of display switches 2 jointly displays a full-screen frame. Not only do the display switches 2 display a single frame each or display a full-screen frame jointly, but the users also press, touch or sense any one (s) of the plurality of display switches 2 to change the frames displayed and turn on/off any one (s) of the plurality of display switches 2 once or more.

What is claimed is:

1. An array display switch, comprising a plurality of display switches arranged in an array to display different frames, allowing users to press, touch or sense any one(s) of the plurality of display switches to not only change interactively the frames displayed but also turn on/off any one(s) of the plurality of display switches;
   wherein an external control apparatus controls the display switches to display different frames, such as monitoring frames or graphics, on display screens, respectively; displaying the monitoring frames entails displaying by the display switches real-time frames captured by picture-taking lenses, users turn on or off the display switches by pressing the display switches.

2. The array display switch of claim 1, wherein the display switches are disposed on a substrate, and at least one port or a wireless transmission apparatus is disposed at any one edge of the substrate to connect to an external control apparatus.

3. The array display switch of claim 1, wherein the frames show video or graphic data, and the data is burned or coded to the array display switch by a burning or coding device in advance, or a control apparatus controls the frames displayed on the display switches and controls the turning on/off of the display switches.

4. The array display switch of claim 1, wherein the display switches each comprise a base, a display screen and a transparent cover.

5. The array display switch of claim 1, wherein the display switches display a single frame each.

6. The array display switch of claim 1, wherein the display switches display a full-screen frame jointly.

7. The array display switch of claim 1, wherein not only do the display switches display a single frame each or display a full-screen frame jointly, but the users also press, touch or sense any one(s) of the plurality of display switches to change the frames displayed and turn on/off any one(s) of the plurality of display switches once or more.

\* \* \* \* \*